United States Patent [19]

Barry et al.

[11] 4,429,574

[45] Feb. 7, 1984

[54] MASS MEASURING SYSTEM

[76] Inventors: Robert C. Barry, 1 Tarlton Ct., Mantua, N.J. 08051; Gary Rachfalski, 206 Lincoln Ave., Collingswood, N.J. 08108

[21] Appl. No.: 316,507

[22] Filed: Oct. 29, 1981

[51] Int. Cl.$^3$ ............................................. G01G 3/16
[52] U.S. Cl. ............................. 73/580; 177/210 FP
[58] Field of Search ............................... 73/580, 579; 177/210 FP

[56] References Cited

U.S. PATENT DOCUMENTS

| | | | |
|---|---|---|---|
| 2,305,783 | 12/1942 | Heymann et al. | 73/580 |
| 3,492,858 | 2/1970 | Heflinger et al. | 73/580 |
| 3,519,093 | 7/1970 | Ramsay | 177/210 FP |
| 3,555,886 | 1/1971 | Thornton | 73/580 |
| 4,050,530 | 9/1977 | Storace | 73/580 |

Primary Examiner—Stephen A. Kreitman
Attorney, Agent, or Firm—Duffield & Lehrer

[57] ABSTRACT

An apparatus for measuring the precise sample mass and corresponding sample weight, being tolerant of and relatively insensitive to unwanted background environmental forces, while functioning independently of the force of gravity, uses a vibratory method and a feedback means to monitor and to sustain the sample mass in oscillation at the mechanical resonant frequency of the system in which the sample mass is introduced. The sample mass is forced to oscillate continuously by electromagnetic action, whereby the resultant motion is transmitted by springs and a transmission structure to supporting piezoelectric transducers. These transducers generate an output voltage signal representative of the sample pan's motion, that is amplified and returned to an electromagnetic drive coil in order to sustain oscillation and maintain the closed-loop nature of this system. These oscillations are monitored and the associated frequency measurements used in calculating the sample mass. A microprocessor is employed to solve a series of complex equations for calibration parameters which dynamically describe not only system mass but also system damping and spring constant while monitoring environmental variables such as temperature to correct the calculations for their effects. The result is a digital display of sample mass in corresponding weight units.

8 Claims, 4 Drawing Figures

MASS MEASURING SYSTEM

The system herein described pertains to mass measuring and, more specifically, to circuitry and apparatus for measuring the precise mass and corresponding weight of a sample.

BACKGROUND OF INVENTION

Many vibratory schemes exist which rely upon measuring a change in the mechanical resonant frequency of a system when a sample mass is introduced. But each has inherent practical and cost limitations.

To constrain linear motion along a single axis, some prior systems use air bearings that require compressor-regulator components and rather precise mechanisms, such as spring loaded sears to release the sample. Other systems incorporating a vibrating beam or other similar means require that the sample be placed in the same precise location in order not to change the moment arm and consequently the frequency characteristics of the system. Still other systems operate at very high mechanical frequencies requiring special substrates or mechanical means of attaching the sample to the pan as well as thermal isolation of the sample from heat generated by mechanical stresses attributable to these high operating frequencies. Others oscillate the pan in a plane perpendicular to the force of gravity and thereby can not benefit fully from the inherrent gravitational force present in terrestial applications, to maintain the sample on the pan without special substrates or mechanical coupling.

SUMMARY OF THE INVENTION

The present invention relates to a vibratory method and means for measuring the precise mass of a sample and does not suffer from the deficiencies of the prior art devices discussed above. The invention is extremely tolerant of and relatively insensitive to unwanted background environmental forces and functions independently of the force of gravity, uses a vibratory method for measuring the precise mass of a sample by determining changes in the mechanical resonant frequency of a uniquely designed oscillating mass-spring cell assembly. The mass-spring cell assembly is forced to oscillate at the mechanical resonant frequency of the system while an electronic monitor assembly continuously extracts the mechanical resonant frequency from the system and determines the feedback necessary to sustain continuous oscillation. A sample mass when introduced causes a change in the mechanical resonant frequency of the system and this change in frequency is a function of the sample mass.

Accordingly it is an object of the invention to provide an improved method and a means for determining the precise mass and corresponding weight of a sample;

Another object of the invention is to provide an improved method and a means for the precision measurement of mass, independent of gravitational force and being extremely tolerant of and relatively insensitive to unwanted background environmental forces;

Still another object of the invention is to provide a vibratory method and a means for measuring the precise mass of a sample by determining changes in the mechanical resonant frequency of an oscillating mass-spring cell assembly;

Another object of the invention is to provide an improved oscillating mass-spring system for the precision determination of sample mass utilizing low amplitude and very low frequency oscillations that require only minimal substrates to affix the sample to the sample pan in zero gravity applications;

A further object of the invention is to provide a mass measuring system with precision accuracy and reproducibility and maintaining these characteristics over a very broad sample mass range;

Still a further object of the invention is to provide an oscillating mass-spring system for the precision determination of sample mass without requiring any special substrates or mechanical means to affix the sample to the sample pan in terrestial applications;

Still another object of the invention is to provide a means to oscillate the mass, to constrain linear motion (the mass-spring cell assembly) and to continuously detect and alert the system of changes in the signal frequency (the electronic monitor assembly);

A further object of the invention is to provide a reliable, economical, minimal maintenance apparatus for quick and accurate mass determination.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
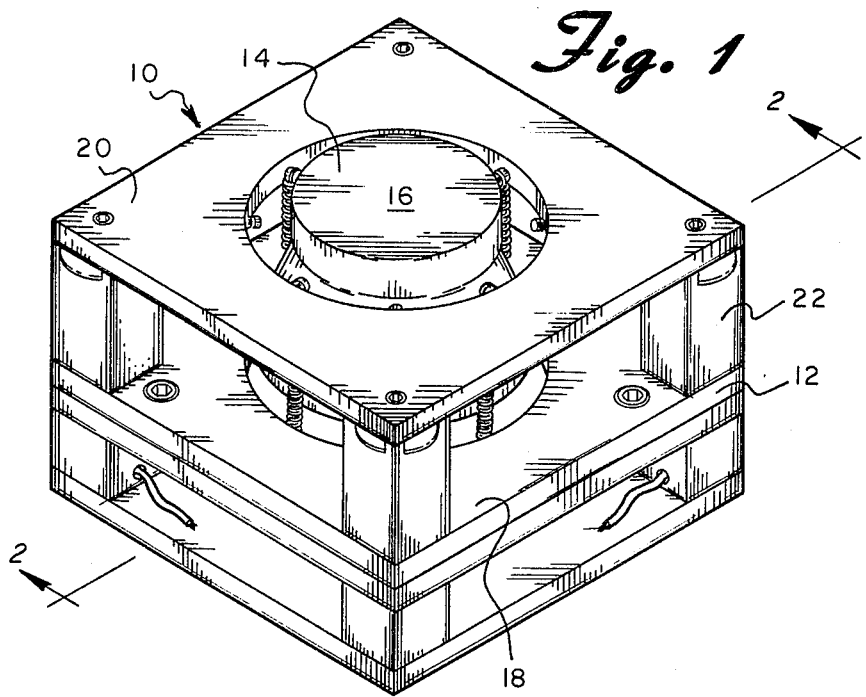
FIG. 1 is a perspective view of a mass measuring system constructed in accordance with the principles of the present invention.

Referring now to the drawings in detail wherein like reference numerals have been used throughout the various figures to designate like elements, there is shown in FIG. 1 a mass measuring system constructed in accordance with the principles of the present invention and designated generally as 10. The system 10 is comprised essentially of a multipart base member 12 and an inertial pan or support means 14 which includes a substantially horizontal surface 16 adapted to support a sample mass to be measured.

The base member 12 is formed of a lower section including a plate 18 and an upper section including a transmission plate 20. Plates 18 and 20 are supported with respect to each other by four substantially identical corner posts 22 in a manner to be described more fully hereinafter. As shown most clearly in FIG. 2, the support means or inertial pan 14 is suspended between the upper and lower plates 18 and 20 by a plurality of precision springs 24. These springs are connected between studs 26 mounted on the inertial pan 14 and similar studs 28 and 30 mounted on the upper and lower plates 18 and 20. In the preferred embodiment, sixteen identical springs 24 are utilized: eight connecting the pan 14 to the lower plate 18 and eight connecting the pan 14 to the upper plate 20. The springs are tensioned in a "pull-pull" arrangement and are equally spaced around the pan 14 with each spring providing the restoring force necessary for simple second order linear motion. As a result of the spring arrangement, substantially only vertical vibrating motion of the pan 14 can result.

Figure 2:
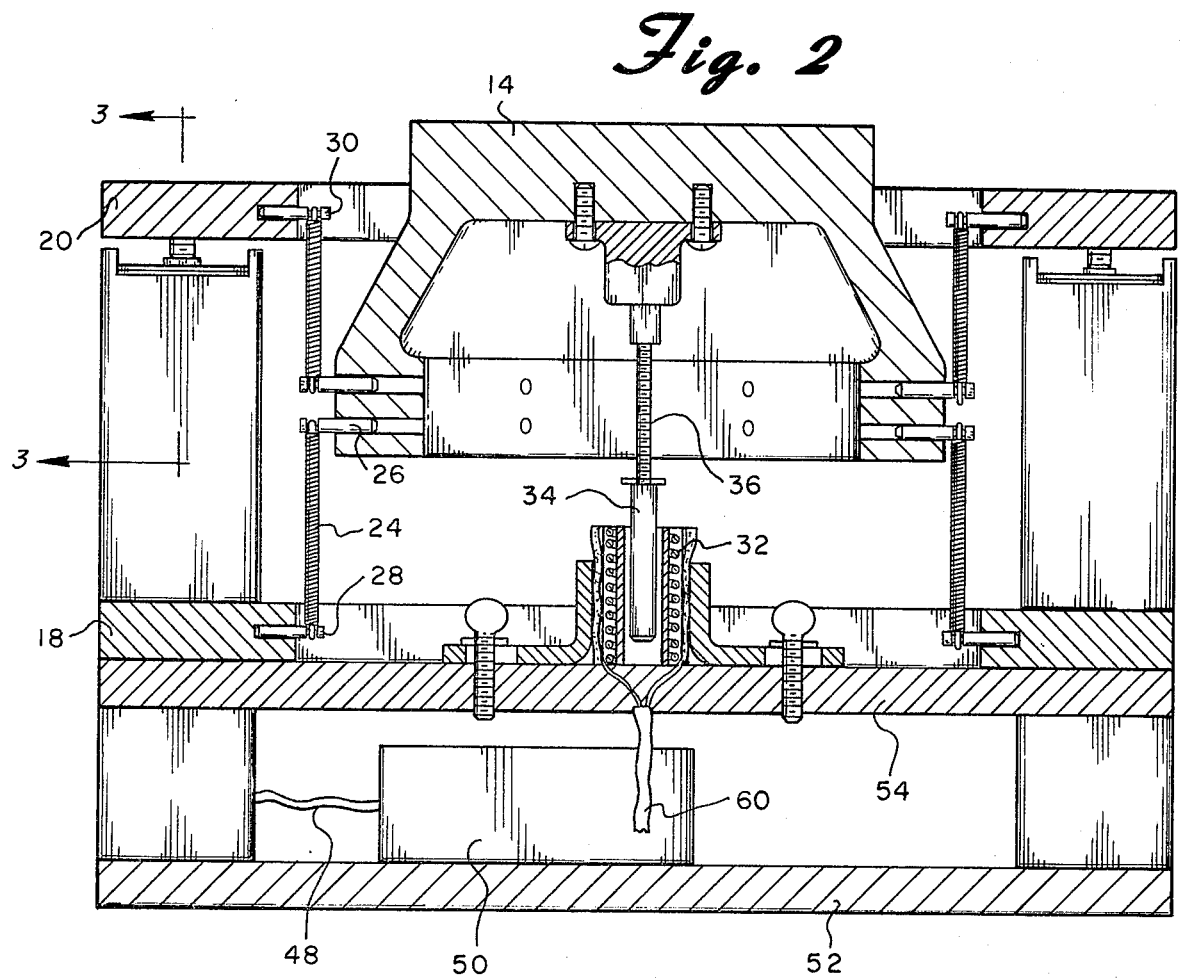
FIG. 2 is a cross-sectional view taken through the line 2—2 of FIG. 1.

As shown most clearly in FIG. 2, the inertial pan 14 is specifically designed so as to exhibit a low rotational inertia which assists to constrain motion to one degree of freedom. This is accomplished by constructing the pan so that it simulates a ring as opposed to a solid disc. In other words, the mass of the pan 14 increases radially outwardly from the center thereof at a rate greater than the square of the distance from the center, i.e. the mass of the pan is concentrated at its outer edge. In the preferred embodiment, the pan 14 is also frusto-conically shaped. This allows the entire device to be made more compact since it brings the side walls of the pan down into the interior of the structure where the springs 24 can be attached.

Located directly beneath the undersurface of the inertial pan 14 is an electromagnetic coil 32. A plunger 34 is secured to the undersurface of the pan 14 so as to extend downwardly into the interior of the coil 32. A screw 36 may be utilized to adjust the height of the plunger 34 through the coil 32 so as to insure a maximum force over the stroke range.

Figure 3:
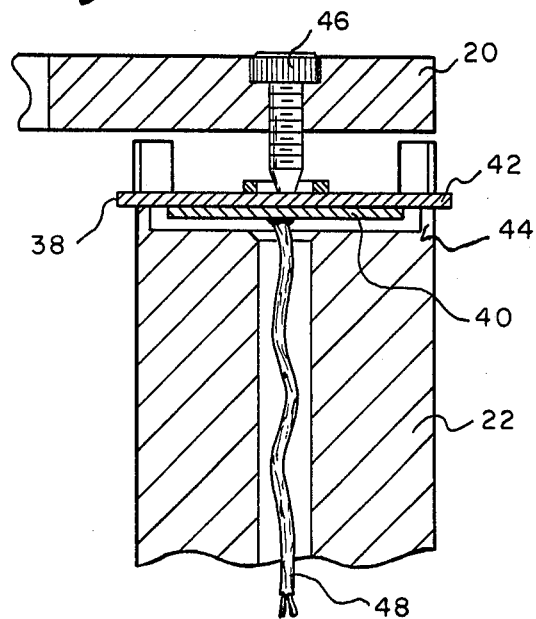
FIG. 3 is a cross-sectional view taken through the line 3—3 of FIG. 2.

Located on the upper end of each of the corner posts 22 is a piezoelectric transducer 38 as shown most clearly in FIG. 3. The piezoelectric transducer 38 is comprized of a piezoelectric element 40 mounted on the lower surface of a brass disc 42. The brass disc is supported on standoffs 44 at the upper end of the corner post 22. A screw 46 extending downwardly from the plate 20 rests on the upper surface of the piezoelectric transducer 38. It should be readily apparent that forces resulting from movement of the inertial pan 14 will be transmitted through the springs 24 and the upper plate 20 to the piezoelectric transducers 38 so that the latter will generate an electrical signal which will be carried to the circuit to be described hereinafter through wires 48. It should also be understood that while only one piezoelectric transducer has been shown in detail in FIG. 3, a similar transducer is located in each of the four corner posts.

Figure 4:
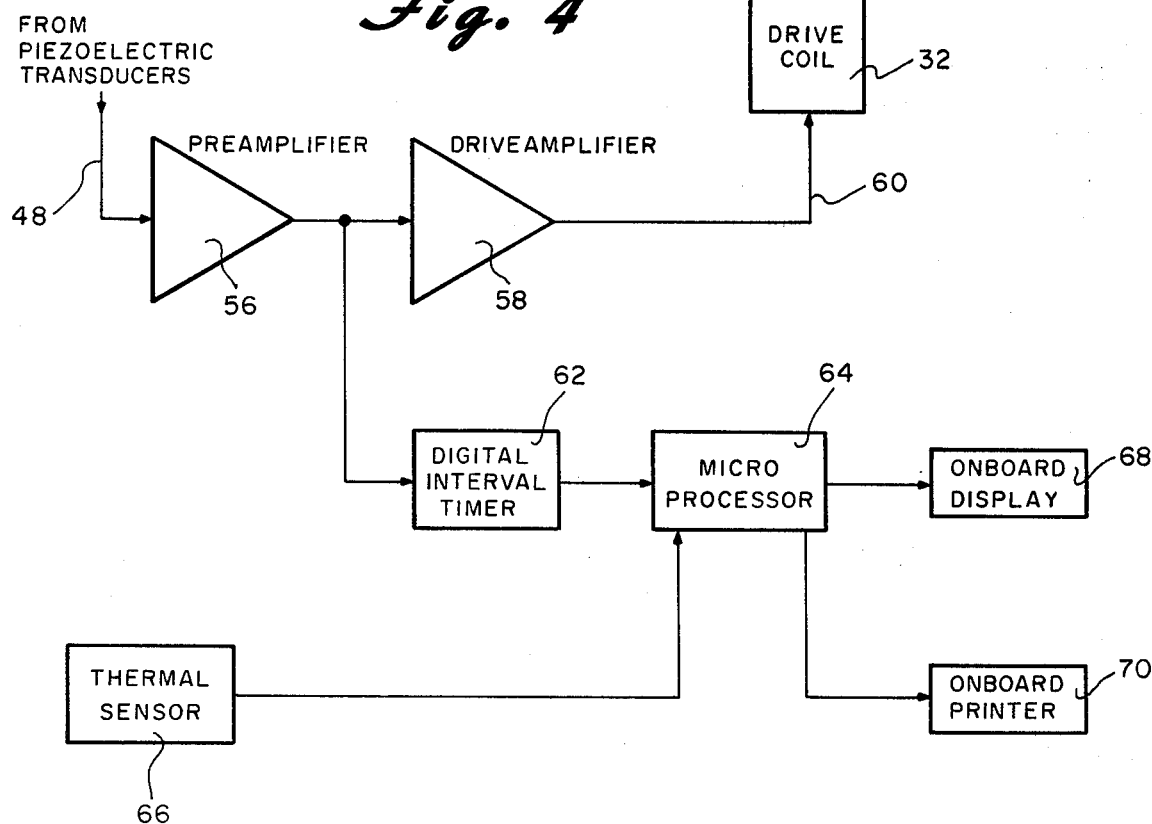
FIG. 4 is a schematic block diagram showing the electronic circuitry utilized with the present invention.

FIG. 4 illustrates the electronic circuitry which is utilized with the structure described above. Preferably, all or part of the circuit is located in a housing 50 mounted on a substrate 52 located beneath the base member 12. A ferrous metal plate 54 separates and isolates the electromagnetic coil 32 from the circuitry located therebelow. (See FIG. 2).

The circuit shown in FIG. 4 includes a preamplifier 56 having its input connected to the wires 48 from the piezoelectric transducers 38. The output of preamplifier 56 is connected to the input of drive amplifier 58 whose output, in turn, is connected to the electromagnetic drive coil 32 through wires 60. The output of preamplifier 56 is also connected to digital interval timer 62 which in turn feeds to the microprocessor 64. Information such as the temperature affecting the device may also be fed to the microprocessor by the use of, for example, thermal sensor 66. The output of the microprocessor 64 is also used to provide a digital display by appropriate means 68 which is mounted on the device, as is the onboard printer 70.

This advanced system for the precision measurement of mass is based on mechanical resonance of a mass-spring system and operates in the following manner. The specially designed mass-spring system, comprised of an inertial pan 14 and multiple precision extension springs 24 in tension, is forced to oscillate by the electromagnetic action of electromagnetic drive coil 32 on the plunger 34. The resultant motion of the inertial pan transmits force through the extension springs and upper plate 20 to the piezoelectric transducers 38. These transducers generate a voltage representative of the inertial pan's motion. This voltage is amplified by preamplifier 56 before being further amplified by the coil drive amplifier 58. The coil drive amplifier then provides current to the electromagnetic drive coil 32 to sustain mechanical resonant oscillations of the inertial pan 14. Due to the closed-loop nature of this combined electromechanical system, the oscillations automatically take place at the mechanical resonant frequency of the mass-spring system. By introducing additional mass to the inertial pan 14, the mechanical resonant frequency will change by a predictable amount. The digitial electronic circuit of FIG. 4 measures the frequency change of the system and converts this measurement to units of mass and corresponding sample weight.

For a lumped mass-spring system, the differential equation of motion with no driving force applied is:

$$m\frac{d^2x}{dt^2} + b\frac{dx}{dt} + kx = 0$$

where
m = lumped mass
b = damping factor
k = spring constant
x = displacement
t = time.

Due to the special configuration of the system described, the inertial pan 14 will preferrentially act as a lumped mass and the multiple extension springs 24 will preferrentially act as a lumped spring while system damping elements may be grouped as a lumped element. The multiple extension springs are always in tension and the inertial pan is designed with a concentration of mass at its periphery to preferrentially restrict motion to a single degree of freedom as designated by "x" in the above equation. Upon solving the above equation for "x" we arrive at:

$$x = e^{-(b/2m)t} * C1 * \cos(-\text{SQUAREROOT}((k/m)-(b^2/4m^2)))t + C2 * \sin(\text{SQUAREROOT}((k/m)-(b^2/4m^2)))t$$

where $b^2 < 4mk$, the case for real applications.

This is an equation of the generalized form:

$$x = A*\cos wt + A*\sin wt$$

which describes sinusoidal motion of amplitude A and angular frequency w. Comparing the generalized and specific equations we see:

$$w = \text{SQUAREROOT}((k/m)-(b^2/4m^2)) \text{ and}$$

$$A = e^{-(b/2m)t}$$

Note that A is a decaying exponential function. If a periodic driving force is applied in phase to the system at the system's frequency "w", it will prevent the decay such that A remains constant until the driving force is removed.

The appropriate basic equation describing system angular frequency is:

$$w = \mathrm{SQUAREROOT}((k/m) - (b^2/4m^2))$$

where "w" is the mechanical resonant angular frequency of the system, "k" is the lumped system spring constant, "b" is the lumped system damping factor and "m" is the system mass, comprised of both system mass and sample mass. Changes in the system mass, due to the introduction of sample mass cause corresponding changes in the mechanical resonant frequency of the system. Equivalent pan mass, system spring constant and system damping are determined by a dynamic calibration routine. Once numerical values are determined for these calibration parameters, precise sample mass is determined by employing the above mentioned basic equation for system motion. With the system equations solved for numerical values of all parameters, system damping "b" is found to be a significant factor in precision applications, even with the use of low damping precision springs. Prior-art devices neglect to address to non-zero system damping showing that they are based on "ideal" preferred embodiments and not on "actual" constructed marketable designs.

For critial precision applications where even sample damping is not neglegible, power is removed from the electromagnetic drive coil of the above described system for several cycles and total damping "b" is mathematically determined from the decaying amplitude of oscillations. A logarithimic amplifier, peak detector, and a-d converter can facilitate this determination. The microprocessor performs the required mathematical calculations.

During normal operation power applied to the electromagnetic drive coil 32 is due to system feedback at the system's mechanical resonant frequency such that the oscillations are maintained at a steady-state amplitude. While the concentrated mass of the inertial pan 14 is much greater than that of the multiple precision extension springs 24 such that the system will preferrentially behave as a lumped system, the springs nevertheless have finite mass capable of introducing high order harmonic oscillations, a characteristic of distributed systems, if random electronic signals or mechanical forces are accidentally allowed to enter the system at these harmonic frequencies. A comparator in the interval timer acts to create a digital logic pulse in response to zero-crossing of the preamplified signal from the piezoelectric transducer. Low level modulation of the fundamental frequency signal due to high order harmonics can result in multiple zero-crossing of the composite signal as the fundamental signal crosses zero. This results in multiple logical pulses being generated by the comparator when only one is appropriate. The monostable multivibrator is configured to remain in the "on" state for a duration longer than the unstable zero-crossing interval of the fundamental signal so that once triggered to the "on" state by the zero crossing of the composite signal, it remains "on" past the time period in which unwanted extra logic pulses could be generated by the comparator. It is configured to return to the "off" state after the danger period such that it is ready for the next zero crossing of the signal. In this manner, one logic pulse is generated for each crossing of the signal. The digital timer, with crystal oscillator time base, thus accurately determines the time interval for system oscillation which is mathematically related to system frequency and consequently to sample mass. An average of numerous measurements automatically takes place to compensate for system errors. A microprocessor is employed to solve a series of complex equations for calibration parameters which dynamically describe not only mass but also system damping and spring constant; then monitoring environmental variables such as temperature to correct the caculations for their effects. The result is a digital display of sample mass in corresponding weight units.

The present invention may be embodied in other specific forms without departing from the spirit or essential attributes thereof and accordingly, reference should be made to the appended claims rather than to the foregoing specifications as indicating the scope of the invention.

We claim:

1. A mass measuring apparatus comprising:
   a base member;
   a support means including a substantially horizontal surface for supporting a sample mass to be measured, said support means being substantially circular in horizontal cross section, the mass of said support means being distributed so that it increases radially outwardly from the center thereof at a rate greater than the square of the distance from the center;
   spring means connecting said support means to said base member so as to allow substantially only vertical vibrating motion of said support means relative to said base member;
   first transducer means for generating an electrical output signal in response to and representative of said vibratory motion of said support means;
   second transducer means coupled to said support means for vibrating the same in response to said signal to thereby sustain said vibratory motion of said support means;
   electronic circuit means including means for evaluating said signal and for generating a mass signal in response thereto representing the mass of said sample.

2. The apparatus as claimed in claim 1 wherein said first transducer means is comprised of a piezoelectric transducer.

3. The appartus as claimed in claim 1 wherein said first transducer means is comprised of a plurality of piezoelectric transducers equally spaced around said support means.

4. The apparatus as claimed in claim 1 wherein said base member is formed of a lower section and an upper section and wherein said spring means is comprised of a plurality of tension springs connected between said lower section and said support means and between said upper section and said support means.

5. The apparatus as claimed in claim 4 wherein said first transducer means is comprised of a plurality of piezoelectric transducers equally spaced around said support means, said piezoelectric transducers being located between and being acted upon by said lower and upper sections of said base member.

6. The apparatus as claimed in claim 1 wherein said spring means is comprised of a plurality of springs equally spaced around and being connected to the periphery of said support member.

7. The apparatus as claimed in claim 6 wherein the combined mass of said springs is substantially smaller than the mass of said support means.

8. The appartus as claimed in claim 1 wherein said support means is substantially frusto conically shaped.

* * * * *